United States Patent
Leng et al.

(10) Patent No.: US 10,365,774 B2
(45) Date of Patent: Jul. 30, 2019

(54) DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Chuanli Leng, Shanghai (CN); Sitao Huo, Shanghai (CN); Feng Lu, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 59 days.

(21) Appl. No.: 15/369,854

(22) Filed: Dec. 5, 2016

(65) Prior Publication Data
US 2017/0083140 A1 Mar. 23, 2017

(30) Foreign Application Priority Data
Sep. 12, 2016 (CN) .......................... 2016 1 0818745

(51) Int. Cl.
G06F 3/044 (2006.01)
G06F 3/041 (2006.01)

(52) U.S. Cl.
CPC ............ *G06F 3/044* (2013.01); *G06F 3/0412* (2013.01); *G06F 3/0416* (2013.01);
(Continued)

(58) Field of Classification Search
None
See application file for complete search history.

(56) References Cited

U.S. PATENT DOCUMENTS

2010/0097344 A1* 4/2010 Verweg .................. G06F 3/044
345/174
2013/0021289 A1* 1/2013 Chen ..................... G06F 1/1601
345/174
(Continued)

FOREIGN PATENT DOCUMENTS

CN 102738199 A 10/2012
CN 104516595 A 4/2015
(Continued)

OTHER PUBLICATIONS

The first office action dated Aug. 11, 2017 in the corresponding German application (application No. 10 2017 100 636.9).

*Primary Examiner* — Brian M Butcher
(74) *Attorney, Agent, or Firm* — Kilpatrick Townsend & Stockton LLP

(57) ABSTRACT

A display panel and a display device are disclosed. The display panel includes a first substrate; a first electrode and a second electrode sequentially formed on the first substrate, an organic light emitting layer being interposed between the first electrode and the second electrode and the second electrode being multiplexed as a first pressure detection electrode; a thin film encapsulation layer formed on the first pressure detection electrode, the thin film encapsulation layer comprising at least one organic layer; and a second pressure detection electrode formed on the thin film encapsulation layer, the second pressure detection electrode being multiplexed as a touch detection electrode.

15 Claims, 13 Drawing Sheets

(52) U.S. Cl.
CPC .......... *G06F 3/0445* (2019.05); *G06F 3/0446* (2019.05); *G06F 2203/04105* (2013.01)

(56) References Cited

U.S. PATENT DOCUMENTS

| | | |
|---|---|---|
| 2014/0034088 A1 | 2/2014 | Padtberg et al. |
| 2016/0026315 A1 | 1/2016 | Choi et al. |
| 2016/0239136 A1 | 8/2016 | Kocak et al. |

FOREIGN PATENT DOCUMENTS

| | | |
|---|---|---|
| CN | 104679359 A | 6/2015 |
| CN | 204759381 U | 11/2015 |
| CN | 105760018 A | 7/2016 |
| WO | 2015088629 A1 | 6/2015 |

\* cited by examiner

DISPLAY PANEL AND DISPLAY DEVICE

CROSS-REFERENCE TO RELATED APPLICATIONS

This application claims priority to Chinese Patent Application No. 201610818745.8, filed on Sep. 12, 2016 and entitled "Display Panel and Display Device", which is herein incorporated by reference in its entirety.

TECHNICAL FIELD

The present disclosure relates to the field of pressure detection technologies, in particular to a display panel and a display device.

BACKGROUND

An Organic light Emitting Display (OLED) panel has already become one of development directions in the display industry due to its technical advantages such as a higher contrast, a smaller thickness, a larger viewing angle and a faster response speed, no need for a backlight.

In order to better meet user's needs, a touch pressure detection device is generally anticipated to be disposed in the organic light emitting display panel to detect the numerical value of a touch pressure, thereby enriching the application scope of the touch detection technology. However, in related art, touch pressure detection devices are generally designed to be directed to a hard glass substrate and are not applicable to a flexible organic light emitting display panel. The sensitivity of the touch pressure detection for the flexible organic light emitting display panel is reduced if the touch pressure detection device is directly integrated into the flexible organic light emitting display panel.

SUMMARY

The present disclosure provides a display panel and a display device so as to achieve an aim of increasing the sensitivity of the touch pressure detection of the flexible organic light emitting display panel.

In one aspect, an embodiment in accordance with the present disclosure provides a display panel including a first substrate, a first electrode and a second electrode sequentially formed on the first substrate, an organic light emitting layer being provided between the first electrode and the second electrode and the second electrode being multiplexed as a first pressure detection electrode, a thin film encapsulation layer formed on the first pressure detection electrode layer, wherein the thin film encapsulation layer includes at least one organic layer, a second pressure detection electrode formed on the thin film encapsulation layer, wherein the second pressure detection electrode is multiplexed as a touch detection electrode.

In another aspect, an embodiment in accordance with the present disclosure further provides a display device including any display panel provided by embodiments of the present disclosure.

By means of interposing the thin film encapsulation layer including an organic layer between the first pressure detection electrode layer and the second pressure detection electrode layer, embodiments in accordance with the present disclosure can solve, by utilizing the good compressive properties of the organic layer, a problem that the sensitivity of the touch pressure detection of the flexible organic light emitting display panel is low due to the existing touch pressure detection devices not applicable to flexible organic light emitting display panels. This improves the sensitivity of the touch pressure detection of the flexible organic light emitting display panel.

DETAILED DESCRIPTION

The disclosure will be further described in detail below in conjunction with the accompanying drawings and embodiments. It should be noted that the specific embodiments disclosed herein are intended for illustration, rather than limiting the disclosure. It should also be noted that the accompanying drawings show only some parts relating to the disclosure, but not in an exhausting way, for the ease of description.

Figure 1A:
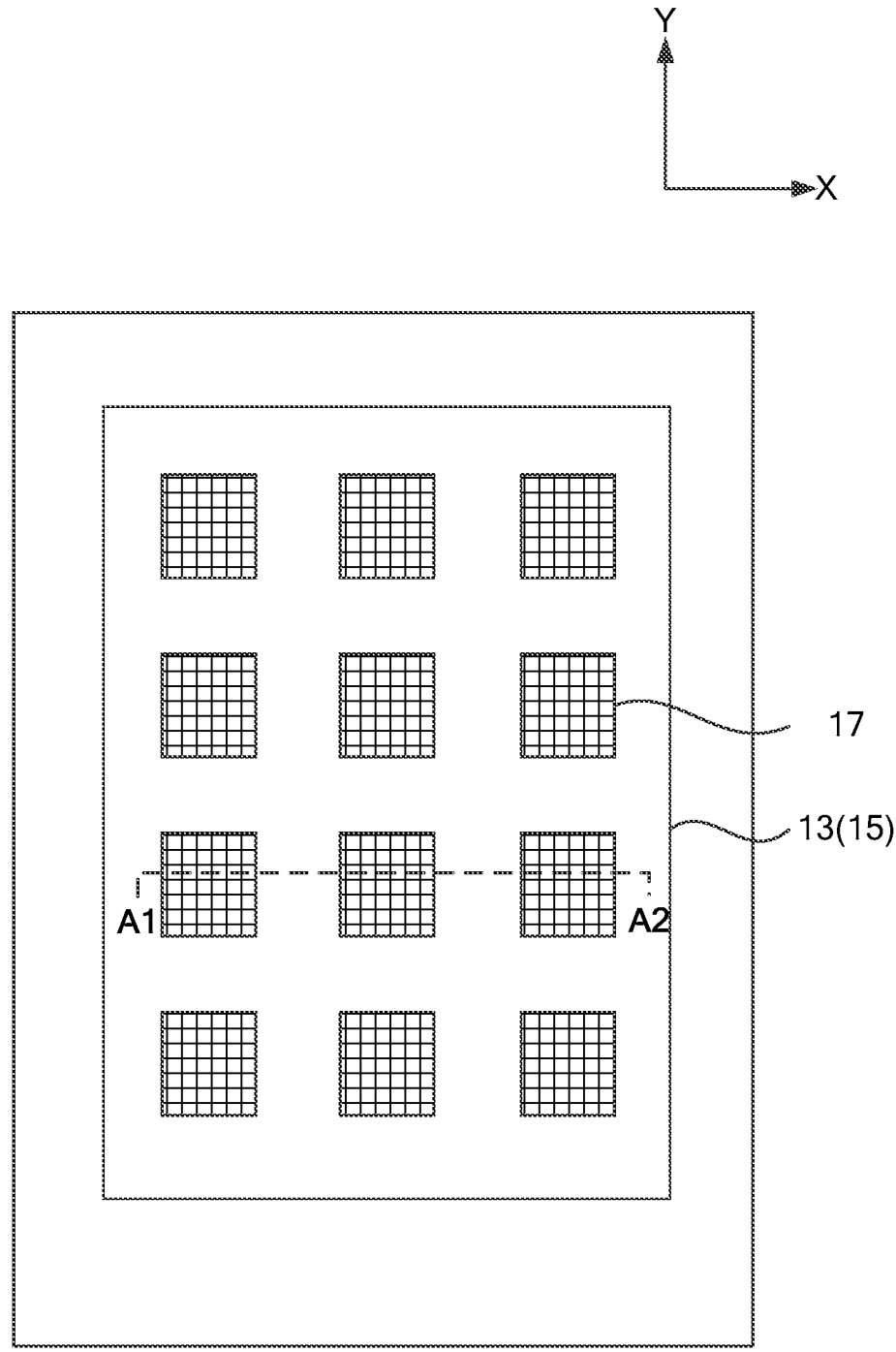
FIG. 1A is a schematic diagram showing the structure of a display panel according to an embodiment of the present invention.
Figure 1B:
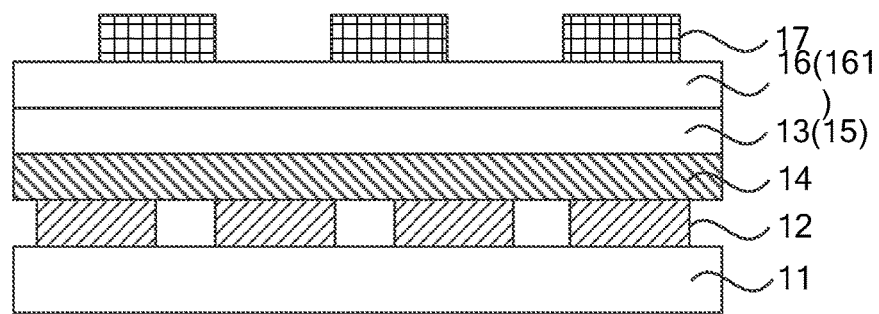
FIG. 1B is a schematic diagram showing a cross-sectional structure taken along line A1-A2 in FIG. 1A according to an embodiment of the present invention.

FIG. 1A is a schematic diagram showing a structure of a display panel according to an embodiment of the present invention, and FIG. 1B is a schematic diagram showing a cross-sectional structure taken along line A1-A2 in FIG. 1A according to an embodiment of the present invention. As illustrated in FIGS. 1A and 1B, the display panel includes a first substrate 11; a first electrode 12 and a second electrode 13 sequentially formed on the first substrate 11. An organic light emitting layer 14 is provided between the first electrode 12 and the second electrode 13, and the second electrode 13 is multiplexed as a first pressure detection electrode 15. A thin film encapsulation layer 16 formed on the first pressure detection electrode layer 15, where the thin film encapsulation layer 16 includes at least one organic layer 161 (only one organic layer 161 is illustrated in FIG. 1B). A second pressure detection electrode 17 formed on the thin film encapsulation layer 16, where the second pressure detection electrode 17 is multiplexed as a touch detection electrode. It should be noted that, in a specific arrangement, the first electrode 12 may be arranged as a block electrode and a plurality of block electrodes 12 are arranged in a matrix manner.

Figure 2:
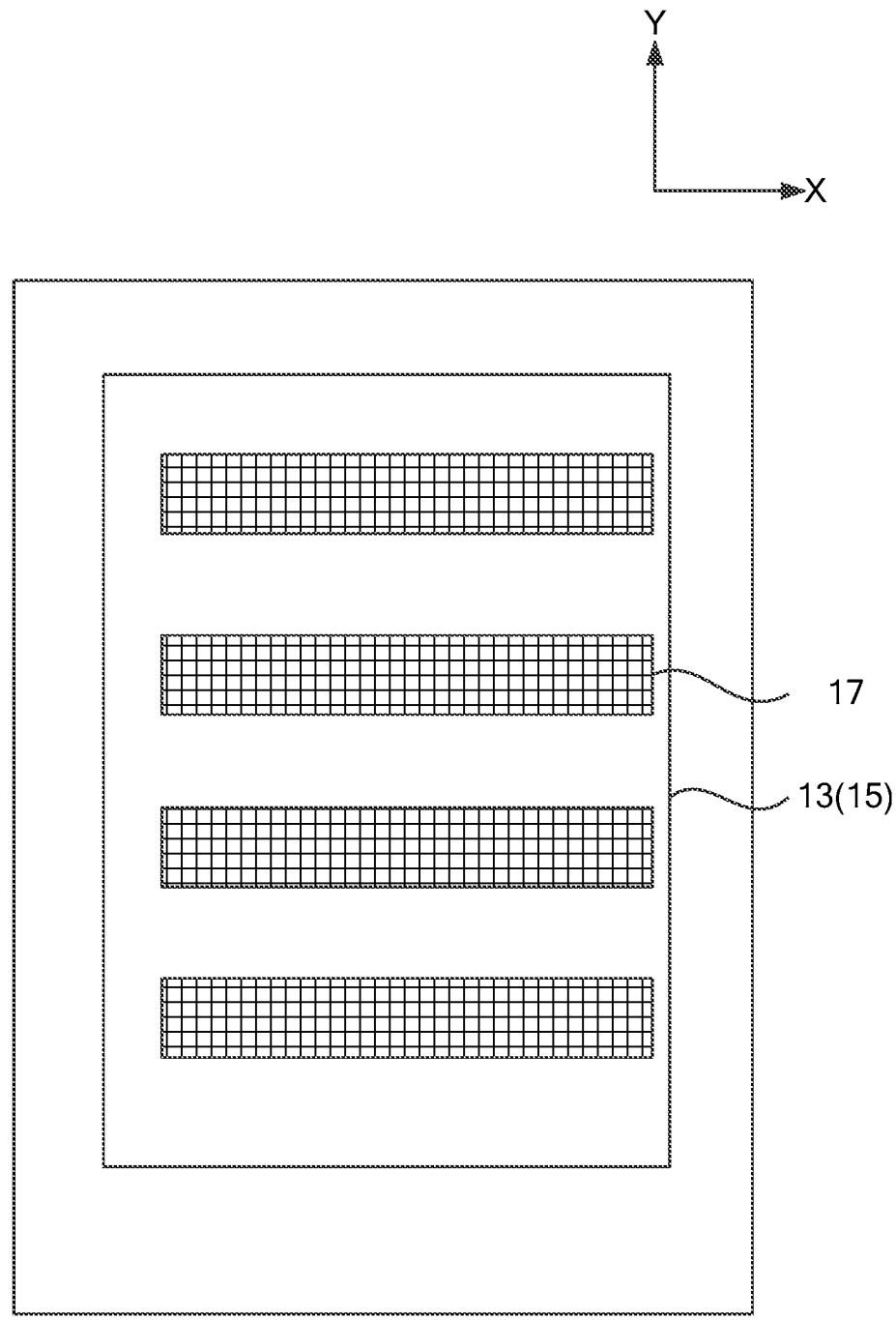
FIG. 2 is a schematic diagram showing the structure of another display panel according to an embodiment of the present invention.
Figure 3:
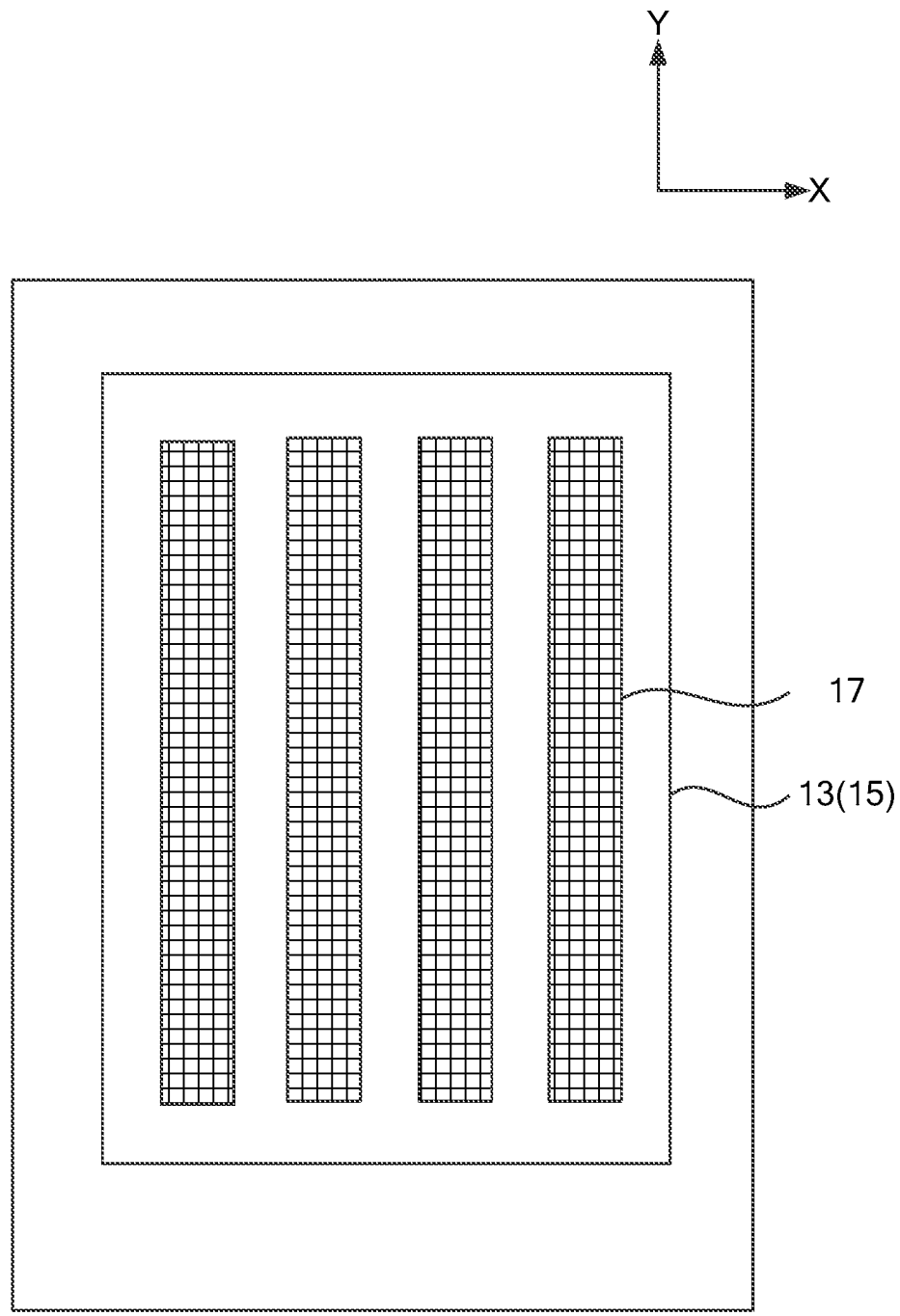
FIG. 3 is a schematic diagram showing the structure of still another display panel according to an embodiment of the present invention.

There may be a plurality of arrangements of the first and second pressure detection electrodes. As illustrated in FIG. 1A, the first pressure detection electrode 15 is arranged in a planar structure, and the second pressure detection electrodes 17 are arranged in a matrix manner. In addition, as further illustrated in FIG. 2, the first pressure detection electrode 15 is arranged in a planar structure, and the second pressure detection electrode 17 is arranged in a strip-shaped structure. Specifically, the second pressure detection electrode 17 has a strip shape. The strip-shaped second pressure detection electrode 17 extends in a first direction (i.e. a direction of X axis in FIG. 2). A plurality of strip-shaped second pressure detection electrodes 17 are sequentially arranged along a second direction (i.e. a direction of Y axis in FIG. 2). Alternatively, as also illustrated in FIG. 3, the strip-shaped second pressure detection electrodes 17 extend in the second direction (i.e. the direction of Y axis in FIG. 3), a plurality of strip-shaped second pressure detection electrodes 17 are sequentially arranged along the first direction (i.e. the direction of X axis in FIG. 3).

In specific fabrication, the second pressure detection electrode 17 may be formed on a surface of the thin film encapsulation layer 16, or may be formed on a surface of a protective film on the thin film encapsulation layer 16, or may be formed on a surface of a cover plate on the protective film.

Figure 4:
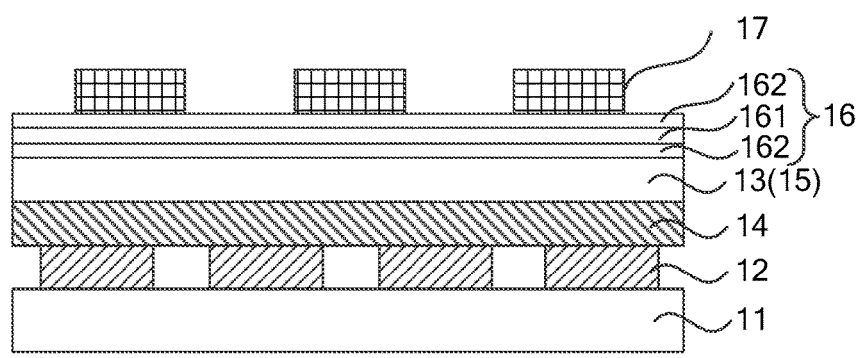
FIG. 4 is a schematic diagram showing the structure of still another display panel according to an embodiment of the present invention.

In addition to the at least one organic layer, the thin film encapsulation layer may further include at least one inorganic layer. FIG. 4 is a schematic diagram showing the structure of still another display panel according to an embodiment of the present invention. As illustrated in FIG. 4, exemplarily, the thin film encapsulation layer 16 includes one organic layer 161 and two inorganic layers 162. The organic layer 161 is alternately disposed with the inorganic layer 162.

At an initial time, namely the time when no user is touching the display panel, a capacitance (namely, an initial capacitance) is formed between the second pressure detection electrode 17 and the first pressure detection electrode 15. During implementation, when the user touches the display panel with a finger, the finger applies a pressure, in a direction from the finger to the second pressure detection electrode 17, to the second pressure detection electrode 17. The second pressure detection electrode 17 deforms under the effect of the pressure, and since the organic layer 161 provided between the second pressure detection electrode 17 and the first pressure detection electrode 15 has a good compressive property, the organic layer 161 also deforms accordingly such that the capacitance between the second pressure detection electrode 17 and the first pressure detection electrode 15 varies. Therefore, the touch pressure inputted by the user is converted into an electrical signal, and the value of the touch pressure may be calculated by means of detecting the capacitance variation between the second pressure detection electrode 17 and the first pressure detection electrode 15.

By means of providing the thin film encapsulation layer including an organic layer between the first pressure detection electrode layer and the second pressure detection electrode layer, embodiments of the present disclosure solve, by utilizing the good compressive property of the organic layer, a technical problem in which the sensitivity of the touch pressure detection of the flexible organic light emitting display panel is relatively low since the existing touch pressure detection devices is not applicable to the flexible organic light emitting display panel. This improves the sensitivity of the touch pressure detection of the flexible organic light emitting display panel. In addition, according to the technical solutions provided by the present embodiment, by means of multiplexing the second electrode as the first pressure detection electrode, only one etching process is required in the fabrication process, it is not necessary to prepare masks for the second electrode and the first pressure detection electrode respectively, thereby saving the cost, reducing the number of processes and improving the fabrication efficiency. Similarly, by means of multiplexing the second pressure detection electrode as the touch detection electrode, the technical solutions of the present embodiment can achieve the aim of saving the cost, reducing the number of processes and improving the fabrication efficiency as well.

A display panel depicted in FIG. 4 is taken as an example, with regard to an organic layer 161 with a certain determined thickness and material, the capacitance variation Δc between the second pressure detection electrode 17 and the first pressure detection electrode 15 meets the following formula:

$$\Delta c = c^*(P/E).$$

Wherein, c denotes the capacitance between the second pressure detection electrode 17 and the first pressure detection electrode 15 at an initial time (namely, the time when no user is touching the display panel), P denotes the value of the pressure applied on the display panel when the user is touch the display panel, and E denotes the elastic modulus of the organic layer 161. As a result, the capacitance variation Δc of the capacitor between the second pressure detection electrode 17 and the first pressure detection electrode 15 is inversely proportional to the elastic modulus E of the organic layer 161, and is proportional to the value P of the pressure applied to the display panel. According to the formula P=F/S (where P denotes the value of the pressure applied to the display panel when the user is touching the display panel, F is the touch pressure applied by the user and S denotes an area of thin film encapsulation layer 16 that is covering the display panel, with regard to any display panel, the area S is constant, and when the user touches the display panel, the pressure P applied to the display panel is proportional to the touch pressure F applied by the user. Overall, the capacitance variation Δc between the second pressure detection electrode 17 and the first pressure detection electrode 15 is proportional to the touch pressure F applied by the user.

The display panel provided in FIG. 4 is taken as a research object, and the effects of the thickness and elastic modulus of the organic layer 161 on the result of the touch pressure detection are researched. Table 1 is the research result. It should be noted that, since the thin film encapsulation layer 16 in FIG. 4 includes two inorganic layers 162 and one organic layer 161, either of the inorganic layers 162 of the thin film encapsulation layer 16 can be equivalent to a capacitor connected in series to the organic layer 161 in the research process. The capacitance value of the inorganic layer 162 remains constant when the display panel is pressed. In addition, in actual use, the capacitance variation Δc of the capacitor between the second pressure detection electrode 17 and the first pressure detection electrode 15 can be detected only when the capacitance variation Δc reaches an order of several fF (femto farad), due to the limitation of the exiting art.

TABLE 1

| Serial No of experiment | Touch pressure F (N) | Thickness of the organic layer 161 (m) | Elastic modulus E of the organic layer 161 (Pa) | Initial capacitance value (pF) | Capacitance variation Δc (pF) |
|---|---|---|---|---|---|
| 1 | 2 | $6.00 \times 10^{-6}$ | $3.00 \times 10^{9}$ | $1.01 \times 10^{2}$ | $2.39 \times 10^{-3}$ |
| 2 | 5 | $6.00 \times 10^{-6}$ | $3.00 \times 10^{9}$ | $1.01 \times 10^{2}$ | $5.98 \times 10^{-3}$ |
| 3 | 5 | $1.00 \times 10^{-6}$ | $3.00 \times 10^{9}$ | $6.37 \times 10^{2}$ | $3.94 \times 10^{-2}$ |
| 4 | 2 | $3.00 \times 10^{-6}$ | $1.00 \times 10^{10}$ | $2.23 \times 10^{2}$ | $1.74 \times 10^{-3}$ |

Referring to Table 1, experiment 1 and experiment 2 are compared, the touch pressure F applied to display panel in the experiment 2 is greater than the touch pressure F applied to display panel in the experiment 1, the capacitance variation Δc in the experiment 2 is greater than the capacitance variation Δc in the experiment 1, that is, the capacitance variation Δc between the second pressure detection electrode 17 and the first pressure detection electrode 15 is proportional to the touch pressure F applied by the user, which is consistent with the aforementioned analytical results.

By comparing the experiment 2 with experiment 3, it can be found that the thickness of the organic layer 161 in the experiment 3 is one sixth of the thickness of the organic layer 161 in the experiment 2. However, after the same touch pressure F is applied, the capacitance variation Δc in the experiment 3 is one magnitude higher than the capacitance variation Δc in experiment 2. Thus, the capacitance variation Δc between the second pressure detection electrode 17 and the first pressure detection electrode 15 can be increased effectively by reducing the thickness of the organic layer 161, that is, the sensitivity of the touch pressure detection of the display panel is increased. Optionally, the thickness of the organic layer 161 is less than 15 micrometers.

By comparing experiment 1 with experiment 4, it can be found that the thickness of the organic layer 161 in the experiment 4 is one half of the thickness of the organic layer 161 in the experiment 1. However, after the same touch pressure is applied, the capacitance variation in the experiment 4 is less than the capacitance variation in the experiment 1. The reason is that the elastic modulus E of the organic layer 161 in the experiment 4 is greater than the elastic modulus E of the organic layer 161 in the experiment 1. Thus, the elastic modulus E of the organic layer 161 is inversely proportional to the capacitance variation Δc which is consistent with the aforementioned analytical results. In addition, since 1.74 fF (the amount of capacitance variation Δc in the experiment 4) is a critical value that can be detected, optionally, the elastic modulus E of the organic layer 161 is less than 10 GPa.

In summary, in a specific fabrication, the sensitivity of pressure detection of the display panel can be effectively improved by means of reducing the thickness of the organic layer 161 or selecting material with good elasticity.

Note that, when the second pressure detection electrode is multiplexed as a touch detection electrode, the second pressure detection electrode may be used as a self-capacitance touch electrode, alternatively, the second pressure detection electrode may co-operate with other electrodes to form a mutual capacitance touch electrode. It will be taken as an example below that the second pressure detection electrode co-operates with other electrodes to form a mutual capacitance touch electrode.

Figure 5A:
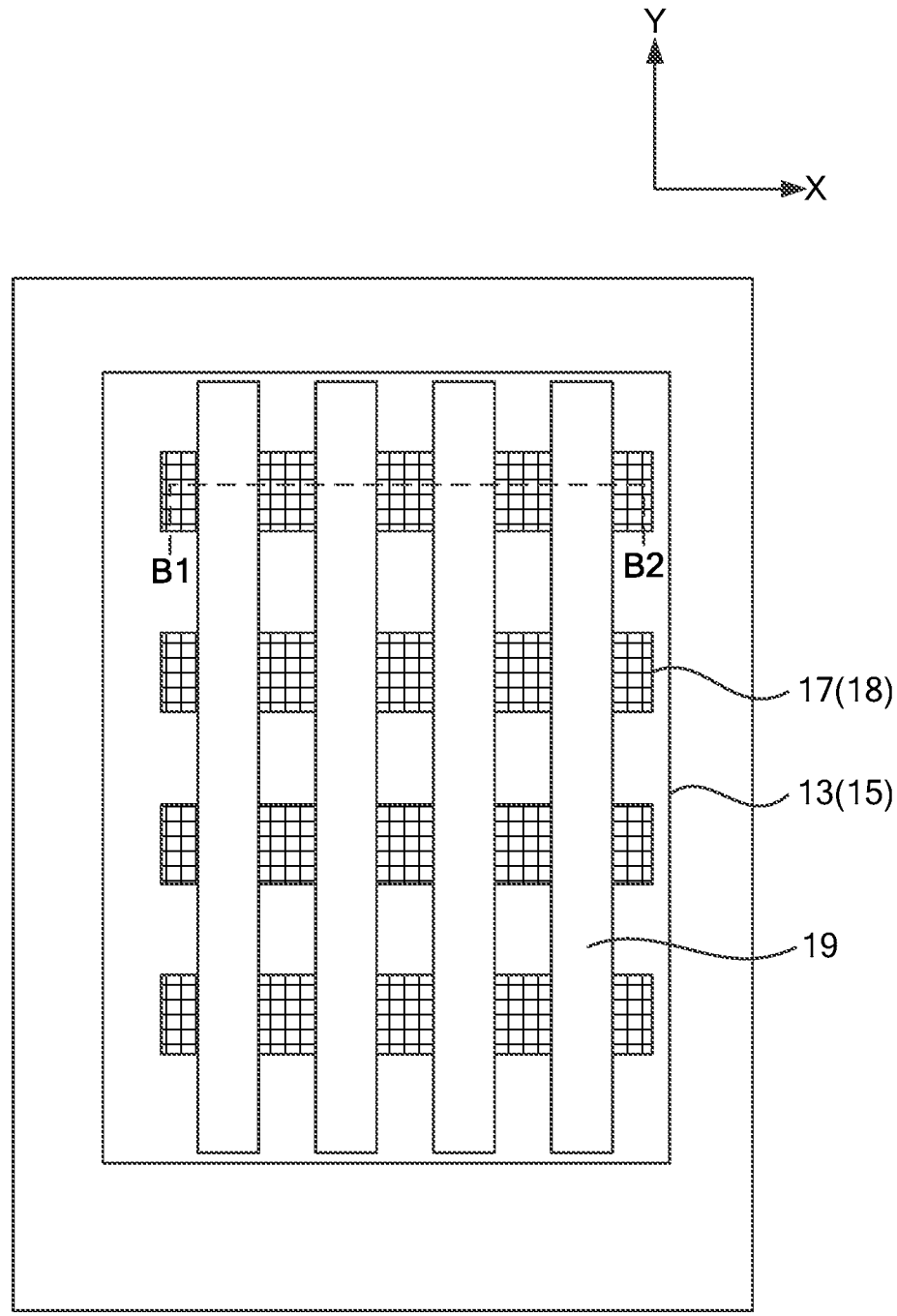
FIG. 5A is a schematic diagram showing the structure of still another display panel according to an embodiment of the present invention.
Figure 5B:
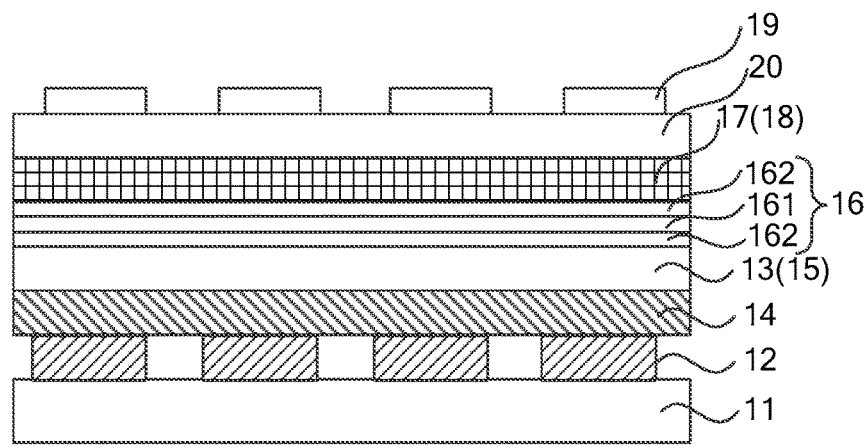
FIG. 5B is a schematic diagram showing the cross-sectional structure taken along line B1-B2 of FIG. 5A according to an embodiment of the present invention.

FIG. 5A is a schematic diagram showing the structure of still another display panel according to an embodiment of the present invention, and FIG. 5B is a schematic diagram showing a cross-sectional structure taken along line B1-B2 in FIG. 5A. Compared with FIG. 4, the display panel in FIGS. 5A and 5B further includes a second touch detection electrode. Specifically, as depicted in FIGS. 5A and 5B, when a second pressure detection electrode 17 is multiplexed as a first touch detection electrode 18, the display panel further includes at least one second touch detection electrode 19 (four second touch detection electrodes 19 are included as exemplified in FIGS. 5A and 5B), the first touch detection electrode 18 and the second touch electrode 19 are insulated from each other (as exemplified in FIG. 5B, insulation layer 20 is provided between the first touch detection electrode 18 and the second touch detection electrode 19 so as to insulate the first touch detection electrode 18 from the second touch electrode 19). The first touch detection electrode 18 includes a first plurality of strip-shaped electrodes extending in a first direction (the direction of X axis in Figures) and arranged along a second direction (the direction of Y axis in Figures). The second touch detection electrode 19 includes a second plurality of strip-shaped electrodes extending in the second direction (the direction of Y axis in Figures) and arranged along the first direction (the direction of X axis in Figures).

Optionally, the first touch detection electrode 18 is made of Indium Tin Oxide or metal material, the second touch detection electrode 19 is made of Indium Tin Oxide or metal material. In order to guarantee that the display panel has a good light transparency, optionally, the first touch detection electrode 18 is made of metal material, and the thickness of the first touch detection electrode 18 is less than 15 nm; the second touch detection electrode 19 is made of metal material and the thickness of the second touch detection electrode 19 is less than 15 nm.

Figure 6:
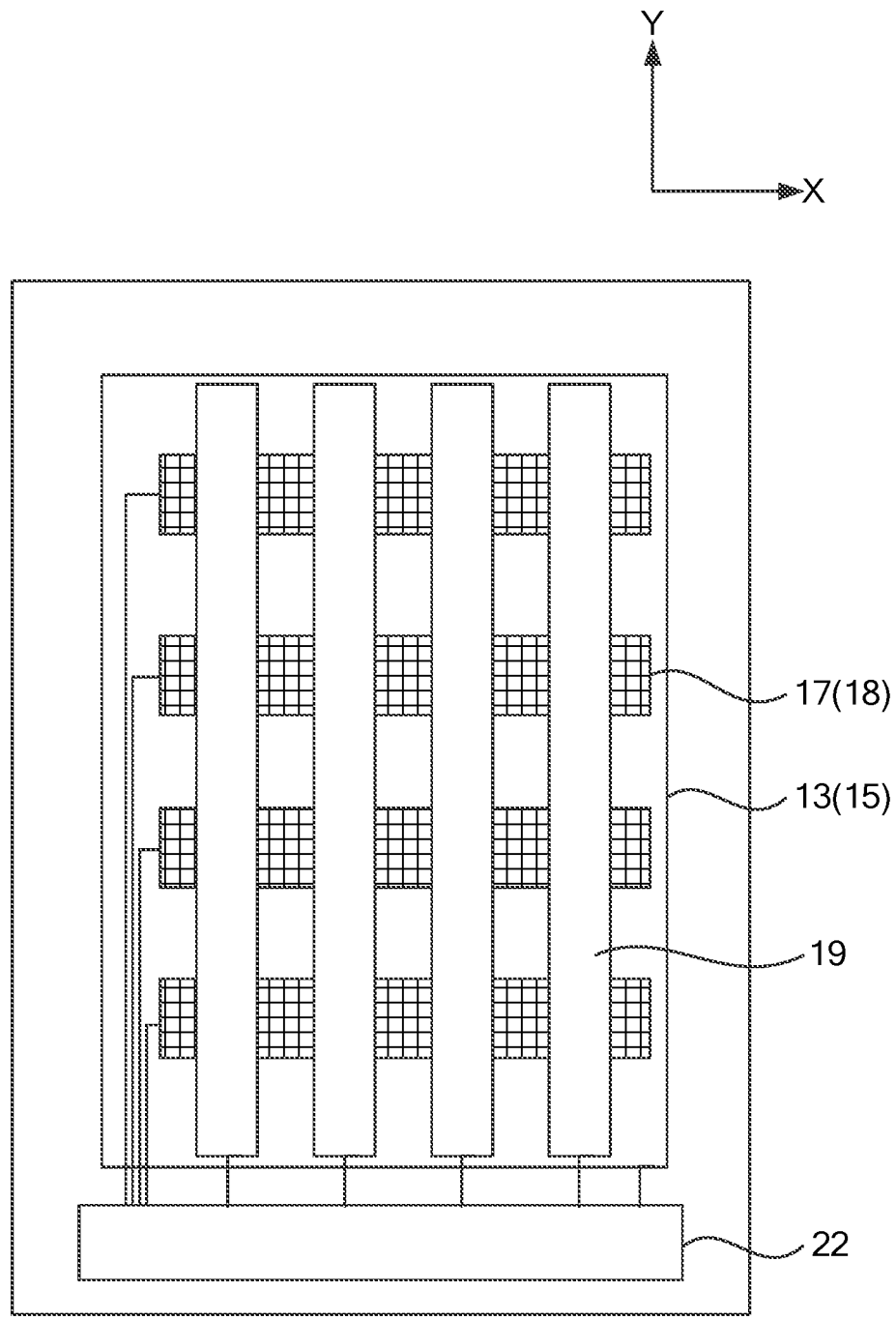
FIG. 6 is a schematic diagram showing the structure of still another display panel according to an embodiment of the present invention.

FIG. 6 is a schematic diagram showing the structure of still another display panel according to an embodiment of the present invention. Compared with the display panel provided in FIG. 5A, the display panel provided in FIG. 6 further includes a driving chip. Specifically, referring to FIG. 6, the driving chip 22 is electrically connected with a second electrode 13, the first touch detection electrode 18 and the second touch detection electrode 19, respectively.

Figure 7:
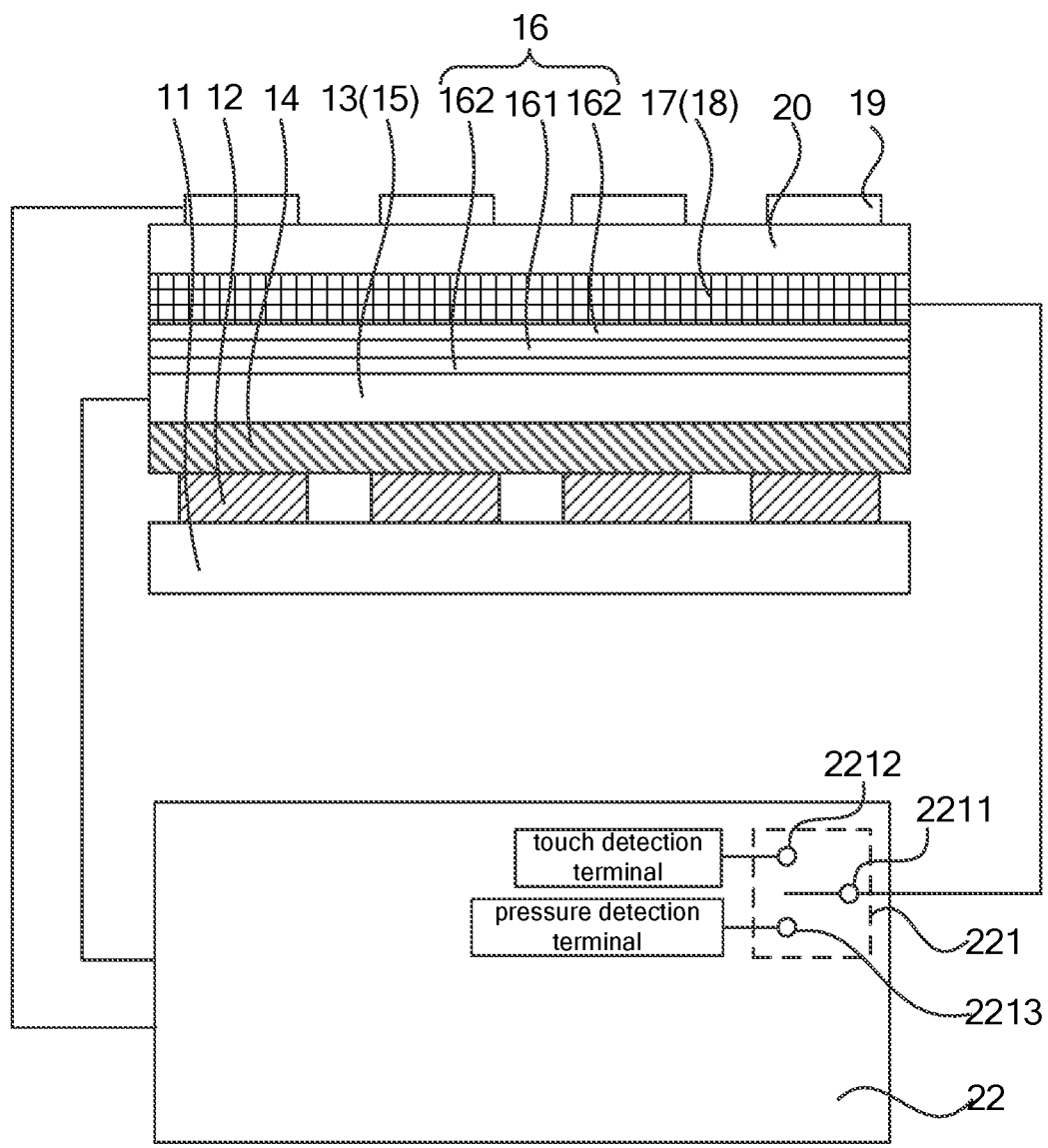
FIG. 7 is a schematic diagram showing the structure of still another display panel according to an embodiment of the present invention.

The driving circuit 22 may have a plurality of internal circuit structures, and different internal circuit structures correspond to different driving manners. FIG. 7 is a schematic diagram showing the structure of still another display panel according to an embodiment of the present invention. Referring to FIG. 7, the display panel further includes a selection switch 221. The selection switch 221 may be integrated into the driving chip 22, or may be disposed outside the driving chip 22. The selection switch 221 is integrated into the driving chip 22, as exemplified in FIG. 7. A first terminal 2211 of the selection switch 221 is electrically connected with the first touch detection electrode 18, a second terminal 2212 of the selection switch 221 is electrically connected with a touch detection terminal of the driving chip 22 and a third terminal 2213 of the selection switch 221 is electrically connected with a pressure detection terminal of the driving chip 22.

Figure 8:
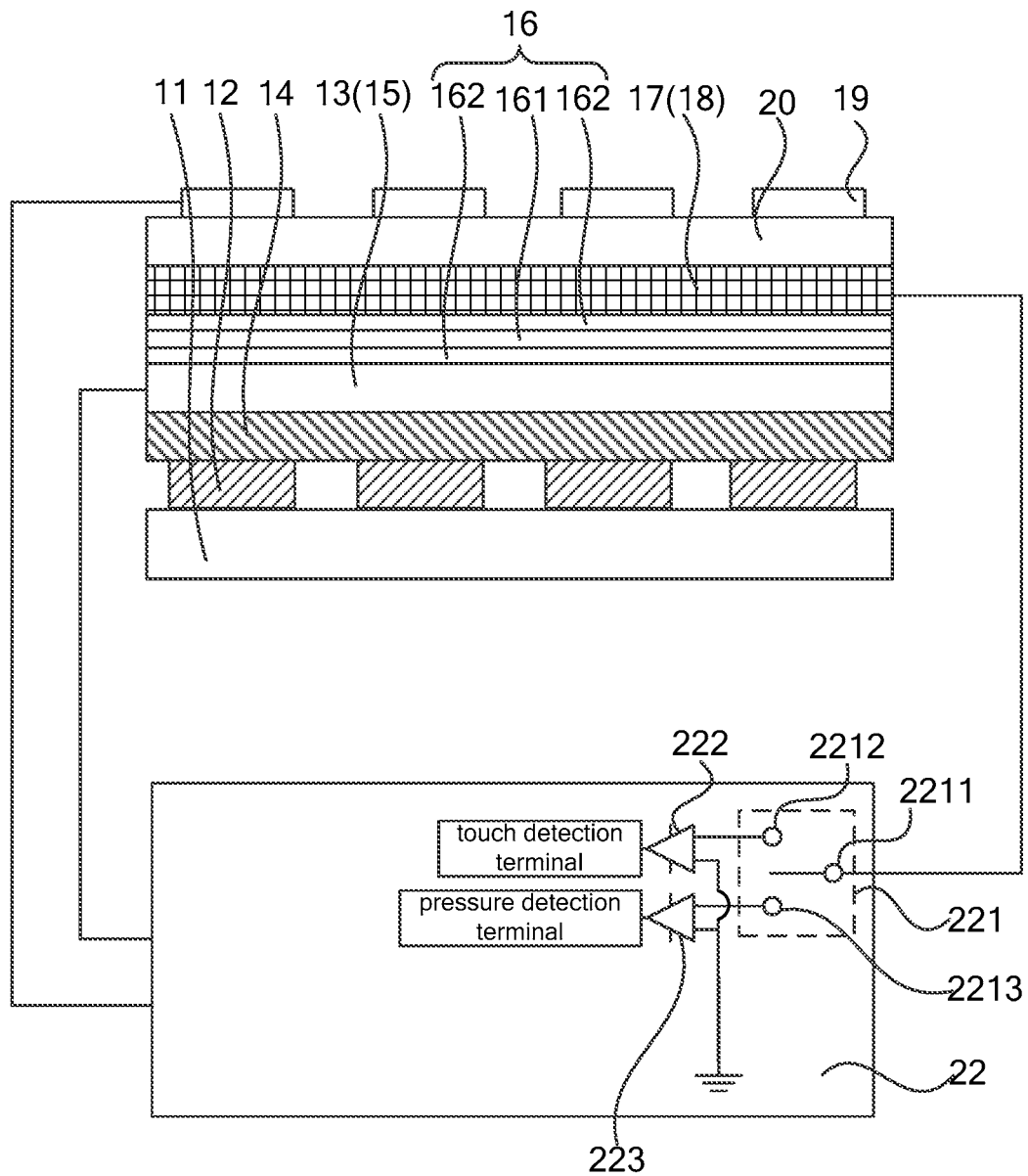
FIG. 8 is a schematic diagram showing the structure of still another display panel according to an embodiment of the present invention.

FIG. 8 is a schematic diagram showing the structure of still another display panel according to an embodiment of the present invention. Compared with the display panel provided in FIG. 7, the display panel provided in FIG. 8 further includes a first amplifier and a second amplifier. Specifically, referring to FIG. 8, the first amplifier 222 is disposed between the second terminal 2212 of the selection switch 221 and the touch detection terminal of the driving chip 22, and is configured to amplify a touch detection signal. The second amplifier 223 is disposed between the third terminal 2213 of the selection switch 221 and the pressure detection terminal of the driving chip 20, and is configured to amplify a pressure detection signal. Similarly, the first amplifier 222 and the second amplifier 223 may be integrated into the driving chip 22, or may be disposed outside the driving chip 22. The first amplifier 222 and the second amplifier 223 are integrated into the driving chip 22, as exemplified in FIG. 8.

During operation, the first touch detection electrode 18 is a touch detection electrode, the second touch detection electrode 19 is a touch driving electrode, and the operation time sequence of the display panel includes a touch detection phase and a pressure detection phase.

During the touch detection phase, the driving chip 22 transmits a touch driving signal to the second touch detection electrode 19, the first terminal 2211 of the selection switch 221 is electrically connected with the second terminal 2212 of the selection switch 221, and the driving chip 20 receives the touch detection signal from the first touch detection electrode 18 to determine a touch position. Optionally, the touch driving signal is an alternating current signal.

On this basis, optionally, during the touch detection phase, the driving circuit 22 transmits the touch driving signal to a first pressure detection electrode 15. A shielding effect is achieved via the above arrangement, so that the capacitance variations between other electrodes caused by touch pressure are prevented and the precision of the detection at the touch position is prevented from being influenced by the capacitance variations between other electrodes.

Figure 9:
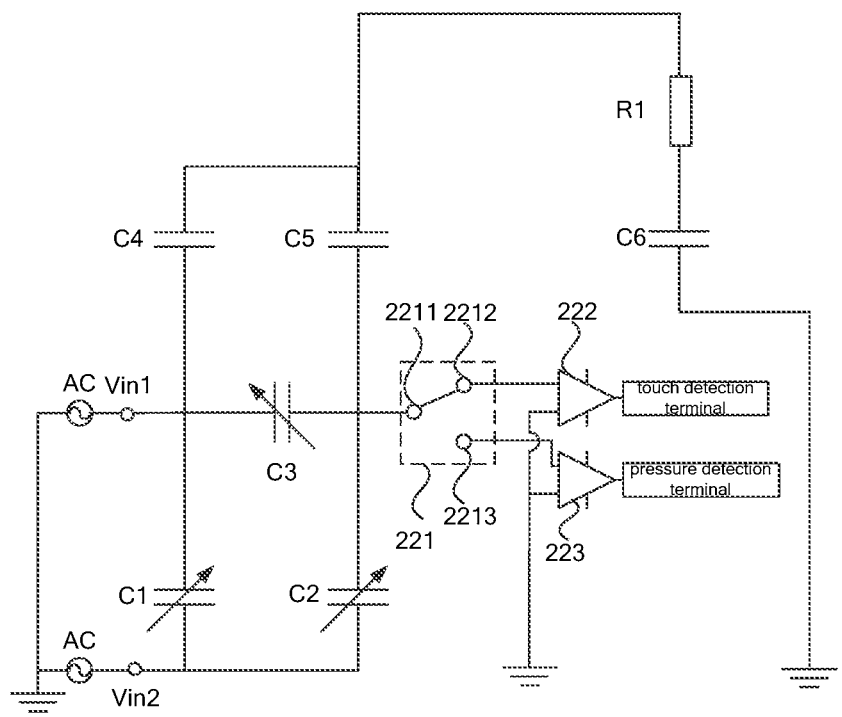
FIG. 9 is an equivalent schematic diagram showing the structure of an internal circuit of the display panel during a touch detection phase according to an embodiment of the present invention.

FIG. 9 is an equivalent circuit diagram of the internal circuit of the display panel during the touch detection phase according to an embodiment of the present invention. Referring to FIGS. 8 and 9, during the touch detection phase, a first terminal 2211 of the selection switch 221 is electrically connected with a second terminal 2212. The driving chip 22 transmits a touch driving signal to the second touch detection electrode 19 and the first pressure detection electrode 15, and receives the touch detection signal from the first touch detection electrode 18 to determine a touch position. Meanwhile, a first capacitor C1 is formed between the second touch detection electrode 19 and the first pressure detection electrode 15, a second capacitor C2 is formed between the first touch detection electrode 18 and the first pressure detection electrode 15, and a third capacitor C3 is formed between the first touch detection electrode 18 and second touch detection electrode 19. When a user touches the display panel with a finger, a fourth capacitor C4 is formed between the finger and the second touch detection electrode 19, and a fifth capacitor C5 is formed between the finger and the first touch detection electrode 18. The path between the body of the user and the ground is equivalent to a first resistor R1 and a sixth capacitor C6 connected in series to each other.

Specifically, a first terminal of the first capacitor C1, a first terminal of the fourth capacitor C4 and a first terminal of the third capacitor C3 are electrically connected to each other and are used as a first input terminal Vin1 that is electrically connected with an alternating current signal outputting terminal inside the driving chip 22. A second terminal of the first capacitor C1 and a first terminal of the second capacitor C2 are electrically connected to each other and are used as a second input terminal Vin2 that is electrically connected with the alternating current signal outputting terminal inside the driving chip 22. A second terminal of the second capacitor C2, a second terminal of the third capacitor C3, a first terminal of the fifth capacitor C5 and the first terminal 2211 of the selection switch 221 are electrically connected to each other. A second terminal of the fourth capacitor C4, a second terminal of the fifth capacitor C5 and a first terminal of the first resistor R1 are electrically connected to each other. A second terminal of the first resistor R1 and a first terminal of the sixth capacitor C6 are electrically connected to each other. A second terminal of the sixth capacitor C6 is grounded.

During a pressure detection phase, the driving chip 22 transmits a first fixed level signal to the first pressure detection electrode 15, the first terminal 2211 of the selection switch 221 is electrically connected with the third terminal 2213, and the driving chip 22 sends a pressure detection signal to the second pressure detection electrode 17 to measure the magnitude of the pressure. Optionally, the pressure detection signal is a direct current signal.

Further, in order to shield the influence of the finger on the touch pressure detection during the pressure detection phase, optionally, in the pressure detection phase, the driving chip 22 transmits a second fixed level signal to the second touch detection electrode 19. The first fixed level signal may be the same as the second fixed level signal, or may be different from the second fixed level signal.

Figure 10:
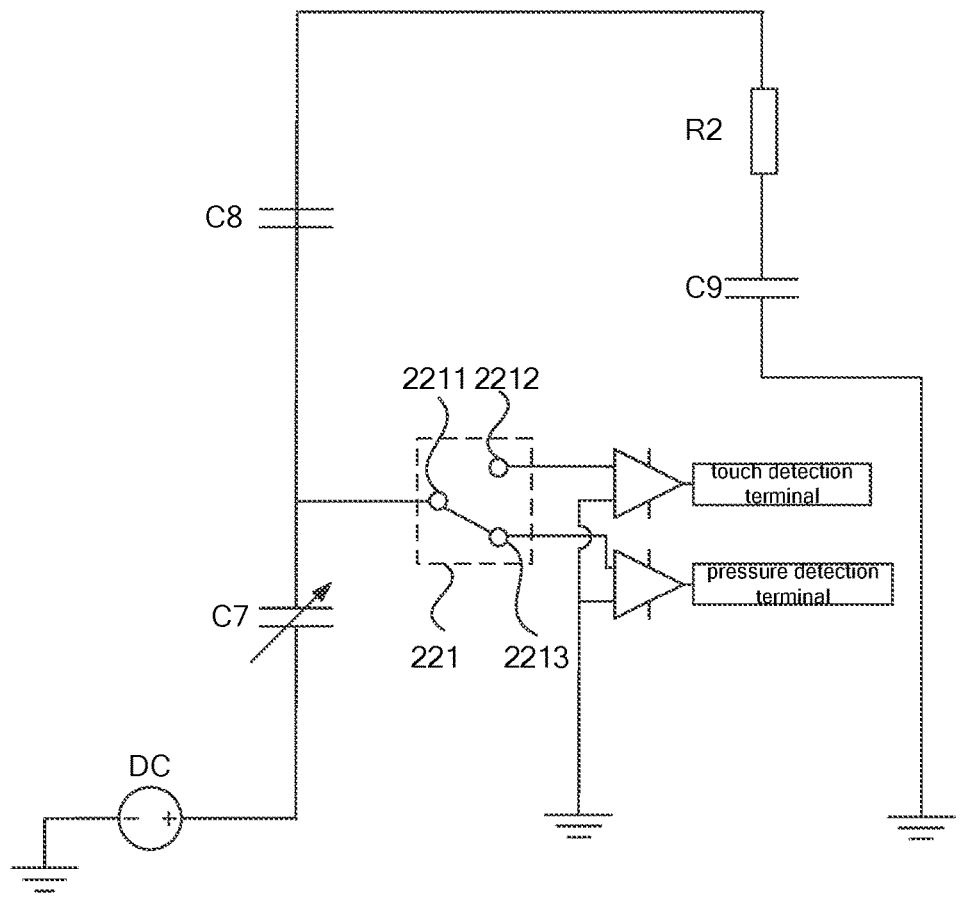
FIG. 10 is an equivalent schematic diagram showing the structure of an internal circuit of a display panel during a pressure detection phase according to an embodiment of the present invention.

FIG. 10 is an equivalent circuit diagram of the internal circuit of the display panel during the pressure detection phase according to an embodiment of the present invention. Referring to FIGS. 8 and 10, the first terminal 2211 of the selection switch 221 is electrically connected with the third terminal 2213. The driving chip 22 transmits the first fixed level signal to the first pressure detection electrode 15, transmits the second fixed level signal to the second touch detection electrode 19, and transmits the pressure detection signal to the second pressure detection electrode 17, so as to measure the magnitude of the pressure. Meanwhile, a seventh capacitor C7 is formed between the first pressure detection electrode 15 and the second pressure detection electrode 17. An eighth capacitor C8 is formed between the finger and the second pressure detection electrode 17 when the user touches the display panel with the finger. The path between the body of the user and the ground is equivalent to a second resistor R2 and a ninth capacitor C9 connected in series to each other.

Specifically, a first terminal of the seventh capacitor C7 is electrically connected with a direct current signal outputting terminal inside the driving chip. A second terminal of the seventh capacitor C7, a first terminal of the eighth capacitor C8 and the first terminal 2211 of the selection switch 221 are electrically connected to each other. A second terminal of the eighth capacitor C8 is electrically connected with a first terminal of the second resistor R2. A second terminal of the second resistor R2 is electrically connected with a first terminal of the ninth capacitor C9. A second terminal of the ninth capacitor C9 is grounded.

Figure 11:
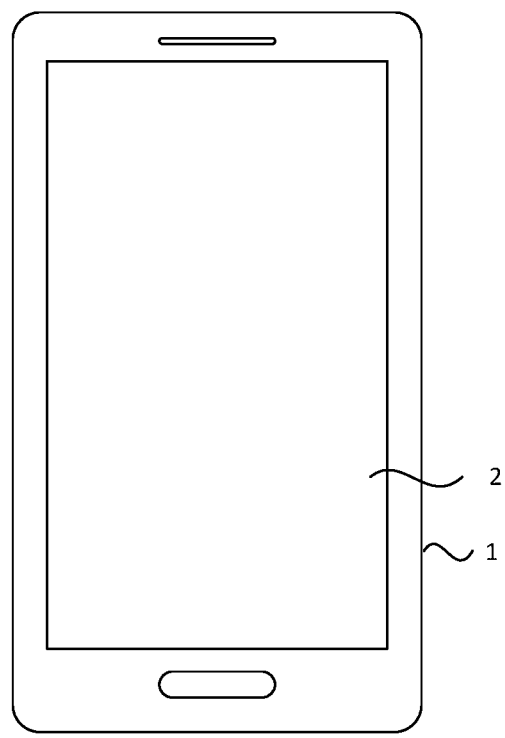
FIG. 11 is a schematic diagram showing the structure of a display device according to an embodiment of the present invention.

FIG. 11 is a schematic diagram showing the structure of a display device according to an embodiment of the present invention. Referring to FIG. 11, the display device 1 includes a display panel 2 provided by any of embodiments of the disclosure and a polarizer (not shown). Specifically, the display device 1 may be a phone, a computer, or a smart wearable device and the like.

According to the present disclosure, the thin film encapsulation layer including an organic layer between the first pressure detection electrode layer and the second pressure detection electrode layer is provided. In the related art, the existing touch pressure detection devices are not applicable to the flexible organic light emitting display panel and the sensitivity of the touch pressure detection of the flexible organic light emitting display panel is relatively low. The present disclosure could solve the problems, because of the good compressive property of the organic layer. The sensitivity of the touch pressure detection of the flexible organic light emitting display panel could also be improved. In addition, according to the technical solutions of the present embodiment, by means of multiplexing the second electrode as the first pressure detection electrode, only one etching process is required in the fabrication process, it is not necessitated to prepare masks for the second electrode and the first pressure detection electrode respectively, thereby saving the cost, reducing the number of processes and improving the fabrication efficiency. Similarly, by means of multiplexing the second pressure detection electrode as the touch detection electrode, the technical solutions of the present embodiment can achieve the aim of saving the cost, reducing the number of processes and improving the fabrication efficiency as well.

It should be noted that the embodiments of the disclosure and the technical principles used therein are described as above. It should be appreciated that the disclosure is not limited to the particular embodiments described herein, and any apparent alterations, modification and substitutions can be made without departing from the scope of protection of the disclosure. Accordingly, while the disclosure is described in detail through the above embodiments, the disclosure is not limited to the above embodiments and can further include other additional embodiments without departing from the concept of the disclosure.

What is claimed is:

1. A display panel, comprising:
    a first substrate;
    a first electrode and a second electrode sequentially formed on the first substrate, wherein the second electrode is multiplexed as a first pressure detection electrode;
    an organic light emitting layer provided between the first electrode and the second electrode;
    a selection switch;
    a thin film encapsulation layer formed on the first pressure detection electrode, wherein the thin film encapsulation layer comprises at least one organic layer; and
    a second pressure detection electrode formed above the thin film encapsulation layer, wherein the second pressure detection electrode is multiplexed as a touch detection electrode,
    wherein the thin film encapsulation layer further comprises at least one inorganic layer, and the at least one organic layer and the at least one inorganic layer are alternately disposed,
    wherein the second pressure detection electrode is multiplexed as a first touch detection electrode, the display panel further comprises at least one second touch detection electrode, and the first touch detection electrode is insulated from the at least one second touch detection electrode; and the first touch detection electrode comprises a first plurality of strip-shaped electrodes extending in a first direction and arranged along a second direction, and the at least one second touch detection electrode comprises a second plurality of strip-shaped electrodes extending in the second direction and arranged along the first direction; and, wherein
    the first touch detection electrode is made of Indium Tin Oxide or metal material, and the at least one second touch detection electrode is made of Indium Tin Oxide or metal material,
    wherein the display panel further comprises a driving chip electrically connected with the second electrode, the first touch detection electrode and the at least one second touch detection electrode respectively,
    wherein a first terminal of the selection switch is electrically connected with the first touch detection electrode, a second terminal of the selection switch is electrically connected with a touch detection terminal of the driving chip, and a third terminal of the selection switch is electrically connected with a pressure detection terminal of the driving chip.

2. The display panel of claim 1, wherein the first pressure detection electrode is arranged in a planar structure, and the second pressure detection electrode is arranged in a matrix or is arranged in strips.

3. The display panel of claim 1, wherein the second pressure detection electrode is formed on one of the following: a surface of the thin film encapsulation layer, a surface of a protective film on the thin film encapsulation layer, a surface of a cover plate on the protective film, directly.

4. The display panel of claim 1, wherein a thickness of the at least one organic layer is less than 15 μm.

5. The display panel of claim 1, wherein an elastic modulus of the at least one organic layer is less than 10 GPa.

6. The display panel of claim 1, wherein the first touch detection electrode is made of metal material, a thickness of the first touch detection electrode is less than 15 nm, the at least one second touch detection electrode is made of metal material, and a thickness of the at least one second touch detection electrode is less than 15 nm.

7. The display panel of claim 1, wherein the first touch detection electrode is the touch detection electrode, the at least one second touch detection electrode is a touch driving electrode, operation time sequence of the display panel comprises a touch detection phase and a pressure detection phase:
    during the touch detection phase, the driving chip transmits a touch driving signal to the at least one second touch detection electrode, the first terminal of the selection switch is electrically connected with the second terminal of the selection switch, and the driving chip receives a touch detection signal from the first touch detection electrode to determine a touch position;
    during the pressure detection phase, the driving chip transmits a fixed level signal to the first pressure detection electrode, the first terminal of the selection switch is electrically connected with the third terminal of the selection switch, and the driving chip transmits a pressure detection signal to the second pressure detection electrode to measure a magnitude of a pressure.

8. The display panel of claim 7, further comprising:
    a first amplifier, disposed between the second terminal of the selection switch and the touch detection terminal of the driving chip, wherein the first amplifier is configured to amplify the touch detection signal; and a second amplifier, disposed between the third terminal of the selection switch and the pressure detection terminal of the driving chip and configured to amplify the pressure detection signal.

9. The display panel of claim 7, wherein in the touch detection phase, the driving chip transmits the touch driving signal to the first pressure detection electrode.

10. The display panel of claim 7, wherein in the pressure detection phase, the driving chip transmits a second fixed level signal to the at least one second touch detection electrode.

11. The display panel of claim 7, wherein the touch driving signal is an alternating current signal and the pressure detection signal is a direct current signal.

12. A display device, comprising a display panel and a polarizer,
wherein the display panel comprises:
a first substrate;
a first electrode and a second electrode sequentially formed on the first substrate, wherein an organic light emitting layer is provided between the first electrode and the second electrode and the second electrode is multiplexed as a first pressure detection electrode;
a selection switch;
a thin film encapsulation layer formed on the first pressure detection electrode, wherein the thin film encapsulation layer comprises at least one organic layer; and
a second pressure detection electrode formed on the thin film encapsulation layer, wherein the second pressure detection electrode is multiplexed as a touch detection electrode,
wherein the thin film encapsulation layer further comprises at least one inorganic layer, and the at least one organic layer and the at least one inorganic layer are alternatively disposed,
wherein the second pressure detection electrode is multiplexed as a first touch detection electrode, the display panel further comprises at least one second touch detection electrode, and the first touch detection electrode is insulated from the at least one second touch detection electrode; and
the first touch detection electrode comprises a first plurality of strip-shaped electrodes extending in a first direction and arranged along a second direction, and the at least one second touch detection electrode comprises a second plurality of strip-shaped electrodes extending in the second direction and arranged along the first direction; and, wherein
the first touch detection electrode is made of Indium Tin Oxide or metal material, and the at least one second touch detection electrode is made of Indium Tin Oxide or metal material,
wherein the display panel further comprises a driving chip electrically connected with the second electrode, the first touch detection electrode and the at least one second touch detection electrode respectively,
wherein a first terminal of the selection switch is electrically connected with the first touch detection electrode, a second terminal of the selection switch is electrically connected with a touch detection terminal of the driving chip, and a third terminal of the selection switch is electrically connected with a pressure detection terminal of the driving chip.

13. The display device of claim 12, wherein the first pressure detection electrode is arranged in a planar structure, and the second pressure detection electrode is arranged in a matrix manner or is arranged in a strip-shaped structure.

14. The display device of claim 12, wherein the second pressure detection electrode is formed on a surface of the thin film encapsulation layer, or formed on a surface of a protective film on the thin film encapsulation layer, or formed on a surface of a cover plate on the protective film.

15. The display device of claim 12, wherein a thickness of the at least one organic layer is less than 15 μm.

* * * * *